US008667947B2

(12) United States Patent
Ota et al.

(10) Patent No.: US 8,667,947 B2
(45) Date of Patent: Mar. 11, 2014

(54) OIL PASSAGE STRUCTURE OF ENGINE

(71) Applicant: Suzuki Motor Corporation, Shizuoka-Ken (JP)

(72) Inventors: Hidekuni Ota, Shizuoka-Ken (JP); Junya Kobayashi, Shizuoka-Ken (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 0 days.

(21) Appl. No.: 13/649,267

(22) Filed: Oct. 11, 2012

(65) Prior Publication Data

US 2013/0087116 A1    Apr. 11, 2013

(30) Foreign Application Priority Data

Oct. 11, 2011    (JP) .................. 2011-224217

(51) Int. Cl.
*F01M 1/02* (2006.01)
(52) U.S. Cl.
USPC ...................................... 123/196 R
(58) Field of Classification Search
USPC ...................................... 123/196 R
See application file for complete search history.

(56) References Cited

U.S. PATENT DOCUMENTS

| | | | | |
|---|---|---|---|---|
| 3,842,938 A | * | 10/1974 | Barnes-Moss | 184/6.5 |
| 4,622,933 A | * | 11/1986 | Fukuo et al. | 123/196 R |
| 4,817,257 A | * | 4/1989 | Mascarenas | 29/888.08 |
| 5,163,341 A | * | 11/1992 | Murrish et al. | 74/595 |
| 5,617,822 A | * | 4/1997 | Masuda | 123/196 R |
| 5,799,547 A | * | 9/1998 | Agarrat | 74/605 |
| 7,954,600 B2 | * | 6/2011 | Ohta | 184/6.5 |
| 2005/0016491 A1 | * | 1/2005 | Leiber et al. | 123/197.4 |
| 2005/0263125 A1 | * | 12/2005 | Terada et al. | 123/196 R |
| 2008/0025658 A1 | * | 1/2008 | Hochmayr et al. | 384/457 |
| 2010/0046869 A1 | * | 2/2010 | Matsuyama | 384/288 |
| 2010/0119181 A1 | * | 5/2010 | Ishigo et al. | 384/294 |

FOREIGN PATENT DOCUMENTS

| | | |
|---|---|---|
| JP | 2006299830 A | 11/2006 |
| WO | 2004038188 A1 | 5/2004 |

* cited by examiner

*Primary Examiner* — Noah Kamen
*Assistant Examiner* — Charles Brauch
(74) *Attorney, Agent, or Firm* — Barnes & Thornburg LLP

(57) ABSTRACT

An oil passage structure for an engine of a vehicle is provided with a connecting rod swingably coupled to a crankshaft rod by a plurality of crankpins, the plurality of crankpins being disposed between a plurality of crank journals, and a plurality of support portions for rotatably supporting the crankshaft by the plurality of crank journals in a cylinder block. The crankshaft has a first oil passage formed therein, the first oil passage supplying oil from an opening formed in one end face thereof to sliding surfaces of the plurality of crankpins, the plurality of support portions have a second oil passage formed therein, the second oil passage supplying the oil to a sliding surface of each of the plurality of crank journals, and the first oil passage and the second oil passage communicate with each other in some of the support portions and in some of the crank journals.

4 Claims, 7 Drawing Sheets

OIL PASSAGE STRUCTURE OF ENGINE

This patent application claims priority to Japanese Patent Application No. 2011-224217, filed 11 Oct. 2011, the disclosure of which is incorporated herein by reference in its entirety.

BACKGROUND OF THE INVENTION

1. Field of the Invention

The present invention relates to an oil passage structure of an engine for supplying oil to a crankshaft of an engine.

2. Description of the Related Art

In a multi-cylinder engine of, for example, vehicle, a steady oil supply is always required for lubrication between a crankpin of a crankshaft and a big end (one end portion having large-diameter than the other end portion) of a connecting rod.

As an ordinary lubrication system, an oil supply system for supplying oil from a plurality of journal walls formed in a cylinder block to respective crankpins through an oil passage formed in the crankshaft has been known (for example, see Patent Document 1 (International Laid-open Publication No. 2004/038188)). In the crankshaft described in the Patent Document 1, an inlet of an oil passage is opened in an outer peripheral surface (sliding contact surface) of each crank journal supported by each journal wall, and an outlet of the oil passage is opened in an outer peripheral surface (sliding contact surface) of each crankpin.

In this Patent Document, there is also disclosed that the oil passage in the crankshaft communicates with an oil passage in the journal wall via an oil groove of a sliding bearing. When the oil is fed from the oil passage in the journal wall to the oil groove of the sliding bearing, the oil flows into the oil passage in the crankshaft from the opening on the inlet side formed in the crank journal. Then, the oil flows through the oil passage in the crankshaft and is supplied between a crankpin and the large-diameter end portion of the connecting rod from the opening on the outlet side.

Furthermore, as another conventional lubrication system, there has been known an oil supply system for supplying oil from one end of a crankshaft to an oil passage formed in a crankshaft and then supplying the oil to a crankpin (for example, see Patent Document 2 (Japanese Patent Laid-Open Publication No. 2006-299830)).

In the crankshaft described in the Patent Document 2, an inlet of an oil passage is opened in one end face of the crankshaft and an outlet of the oil passage is formed in an outer peripheral surface of each crankpin. In this lubrication system, the oil flows into the oil passage in the crankshaft from the opening on the one end face of the crankshaft and flows through the oil passage and is supplied between a crankpin and a large-diameter end portion of a connecting rod from the opening on the outlet side.

In the lubrication system described in the Patent Document 1, the oil is supplied via the sliding bearing, so that an oil supply to the oil passage in the crankshaft is indirect. In addition, when the crankshaft is rotated at a high speed, the oil does not easily flow into the oil passage in the crankshaft from the opening on the inlet side of a crank journal due to centrifugal force. For this reason, there is a possibility that a shortage of oil supply to the crankpin will be caused. With this point, in the lubrication system described in the Patent Document 2, the oil from an oil pump is supplied directly to the oil passage in the crankshaft without flowing through a sliding bearing, and the oil is fed from the one end face of the crankshaft, thus applying less effect of the centrifugal force on the oil.

However, in the lubrication system described in the Patent Document 2, the oil flows from the one end face of the crankshaft, which requires a long oil passage to the crankpin positioned on the other end side of the crankshaft. For this reason, in a condition when the temperature is low and the viscosity of the oil is high, a delay in oil supply is caused to thereby raise the possibility of causing a shortage of oil supply to the crankpin positioned in the deepest portion of the crankshaft. To solve this inconvenience, although it may be thought to increase an amount of oil supply, the increasing in the oil amount may lead to another problem of increasing a discharge capacity of an oil pump, hence increasing a mechanical loss.

SUMMARY OF THE INVENTION

The present invention has been made in consideration of the circumstances encountered in the prior art mentioned above, and an object thereof is to provide an improved oil passage structure of an engine capable of steadily supplying a sufficient amount of oil to a crankpin.

The above and other objects can be achieved according to the present invention by providing an oil passage structure of an engine including: a connecting rod swingably coupled to a crankshaft by a plurality of crankpins, the plurality of crankpins being disposed between a plurality of crank journals; and a plurality of support portions for rotatably supporting the crankshaft by the plurality of crank journals in a cylinder block, wherein the crankshaft has a first oil passage formed therein, the first oil passage supplying oil from an opening formed in one end face thereof to sliding surfaces of the plurality of crankpins, the plurality of support portions have a second oil passage formed therein, the second oil passage supplying the oil to a sliding surface of each of the plurality of crank journals, and the first oil passage and the second oil passage communicate with each other in some of the support portions and in some of the crank journals.

According to the above aspect of the present embodiment, when the crankshaft is rotated at a high speed, the oil is supplied to the sliding surfaces of the respective crankpins through the first oil passage. Further, in an occasion when the temperature is low and the viscosity of the oil is high, the oil is hard to flow in the first oil passage but a shortage of oil in the first oil passage is compensated for by the oil fed from the second oil passage via a communication portion. Hence, a delay in oil supply can be suppressed and the oil can be adequately supplied to the sliding surfaces of all of the crankpins.

In particular, when the engine is rotated at a low speed immediately after a startup, a centrifugal force applied to the oil in the crank journal is weak, and hence, the oil easily flows into the first oil passage from the second oil passage. Furthermore, it is not necessary for an oil pump to have a large discharge capacity, so that a mechanical loss in not increased.

The present embodiment may have the following preferred modes.

It may be desired that the first oil passage and the second oil passage communicate with each other in the support portion and the crank journal which are disposed at a position which is apart farthest from the one end face of the crankshaft.

It may be further preferred that an inside diameter of the first oil passage is larger than an inside diameter of the second oil passage.

The cylinder block may be formed with a third oil passage formed therein so as to supply the oil to a cylinder head, and communicates with the second oil passage.

It may be further desired that an oil clearance formed between a sliding surface of the connecting rod and the sliding surface of the crankpin is larger than an oil clearance formed between a sliding surface of the support portion and a sliding surface of the crank journal, with which the first oil passage and the second oil passage communicated.

According to the above preferred modes of the present embodiment, the following advantageous effects may be additionally achieved.

At a time when the temperature is low and the viscosity of the oil is high, a problem of shortage of oil on the sliding surface of the crankpin which is apart farthest from the one end face of the crankshaft can be solved.

Furthermore, an oil supply to the sliding surface of the crankpin from the first oil passage is prior to an oil supply to the sliding surface of the crankpin from the second oil passage via a communication portion.

According to the formation of the third oil passage supplying the oil to a cylinder head and communicating with the second oil passage, at a time when the engine is stopped, the oil supplied to the cylinder head falls down under its own weight to a cylinder block side via the third oil passage. The oil is supplied to the sliding surface of the crank journal via the second oil passage from the third oil passage. Thus, even in a time when the engine is again started, an oil shortage problem can be solved, and hence, the seizure of the crankshaft can be prevented.

Still furthermore, an oil leak is reduced in the communicated portion, and hence, the oil easily flows from the second oil passage to the first oil passage. Thus, an amount of oil to be supplied to the sliding surface of the crankpin can be ensured. According to the present invention, a sufficient amount of oil can be supplied to the sliding surface of the crankpin in a range in which an engine rotation speed changes from a low rotation speed to a high rotation speed and in a range in which the temperature of the oil changes from a low temperature to a high temperature.

The nature and further characteristic features of the present invention will be made clearer from the following descriptions made with reference to the accompanying drawings.

BRIEF DESCRIPTION OF THE DRAWINGS

In the accompanying drawings:

FIG. 5 including

DESCRIPTION OF THE PREFERRED EMBODIMENT

Figure 1:
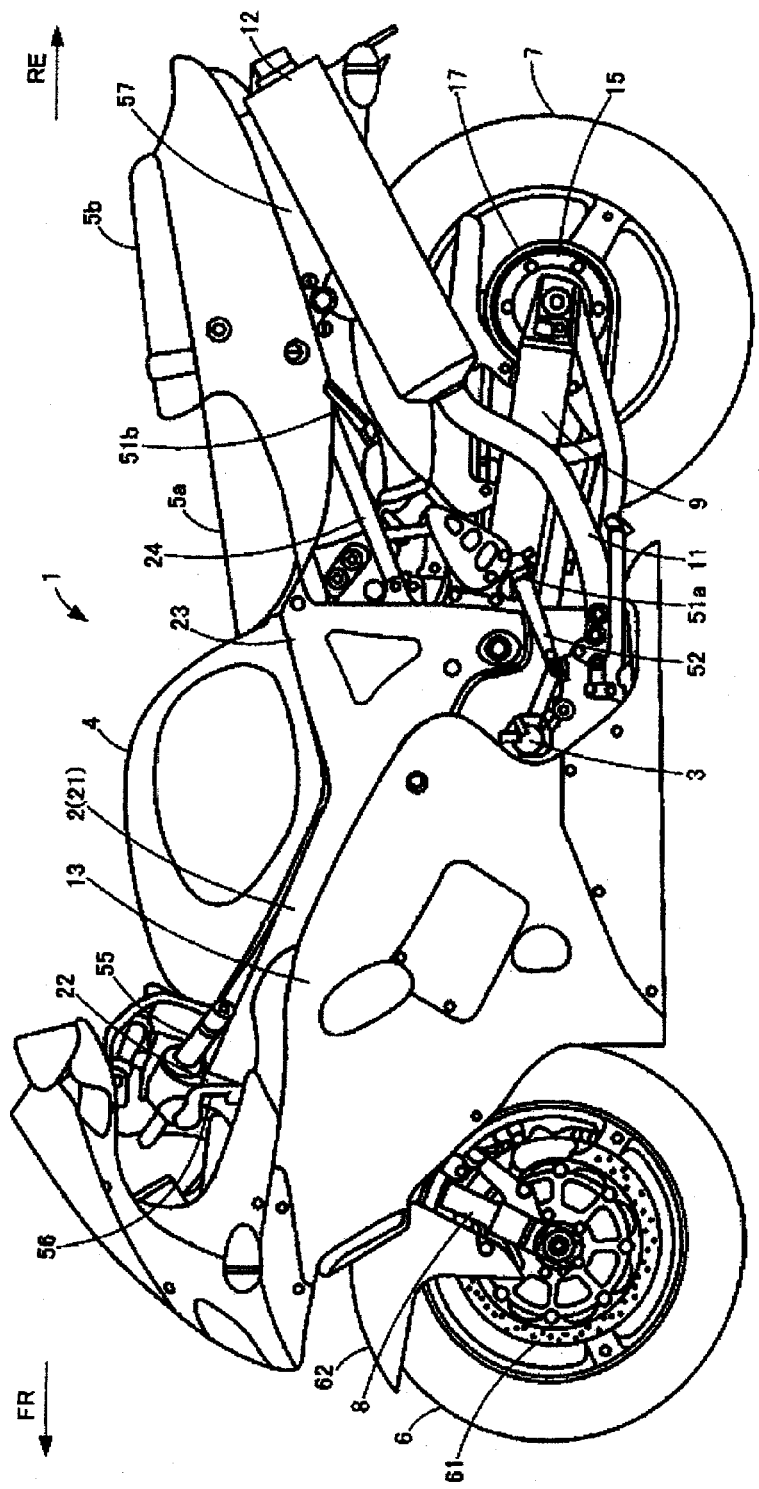
FIG. 1 is a left side view of a motorcycle provided with an oil passage structure of an engine according to the present embodiment.

The present embodiment will be described hereunder in detail with reference to the accompanying drawings. Further, it is to be noted that an example will be described, hereunder, in which an engine suspension structure of the present invention is applied to a sport-type motorcycle such as shown in FIG. 1. However, the engine suspension structure of the present invention is not limited to this type motorcycle, and any modification may be applied as required. For example, the engine suspension structure of the present invention may be applied to a motorcycle of the other type, a four-wheel vehicle, a buggy vehicle, a snowmobile, a boat or ship, and the like.

A general construction of the whole of a motorcycle provided with an engine having an oil passage structure according to the present embodiment will be described with reference to FIG. 1 showing a left side view of the motorcycle. It is further to be noted that, in the following drawings, a front side of a vehicle body is denoted by an arrow "FR" and a rear side of the vehicle body is denoted by an arrow "RE", and terms "upper", "lower", "right", "left" and like terms indicating direction are used herein with reference to the illustrations of the drawings or in a usual standing state of the motorcycle such as shown in FIG. 1.

As shown in FIG. 1, a motorcycle 1 has a vehicle body frame 2 made of steel or aluminum alloy and having various units or components such as a power unit, an electric unit, and the like mounted thereon.

A main frame 21 of the vehicle body frame 2 is bifurcated rearward into left and right parts from a head pipe 22 positioned at a front end so as to extend obliquely rearward and downward. A rear portion of an engine 3 is suspended below the main frame 21. A fuel tank 4 is disposed on an upper portion of the main frame 21. A pair of left and right center frames 23 extending in a vertical direction are connected to the rear portions of the main frame 21.

A pair of left and right seat rails 24 extending rearward and upward are connected to the rear portions of the center frames 23. A driver seat 5a and a passenger seat 5b are continuously coupled to the upper portions of the seat rails 24 rearward of the fuel tank 4. Footrests 51a, 51b are disposed under the driver seat 5a and the passenger seat 5b respectively correspondingly. A shift pedal 52 is disposed in front of the footrest 51a for a driver on the left side of the vehicle body. A brake pedal, not shown, for a rear wheel 7 is disposed forward of the footrest 51a for the driver on the right side of the vehicle body.

A pair of front forks 8 is supported to be steerable via a steering shaft disposed in a head pipe 22 above a front portion of the vehicle body frame 2. Each of the pair of front forks 8 is provided with a shock-absorbing suspension for a front wheel.

A handlebar is disposed at an upper portion of the steering shaft, and grips 55 are fitted on both end portions of the handlebar. The handlebar on the left side of the vehicle body is provided with a clutch lever 56 and the handlebar on the right side of the vehicle body is provided with a brake lever, not shown, for a front wheel 6.

The front wheel 6 is rotatably supported by the lower portions of the pair of front forks 8, and a front fender 62 for covering the upper portion of the front wheel 6 is disposed on the lower portions of the pair of front forks 8. The front wheel 6 is provided with a brake disk 61.

Swing arms 9 are swingably coupled to the lower sides of the center frames 23 so as to swing in a vertical direction. A shock-absorbing suspension, not shown, for a rear wheel is fixed between the center frame 23 and the swing arm 9, which are disposed on the left side, and another shock-absorbing suspension, not shown, for a rear wheel is fixed between the center frame 23 and the swing arm 9, which are disposed on the right side.

A rear wheel 7 is rotatably supported by the rear portions of the swing arms 9. The rear wheel 7 is provided with a driven sprocket 15. A drive chain 17 is looped over the driven sprocket 15 and a drive sprocket, not shown, on the engine 3 side. An upper portion of the rear wheel 7 is covered with a rear fender 57 disposed below the passenger seat 5b. The rear wheel 7 is provided with a brake disk, not shown.

The engine 3 is constructed of, for example, a parallel four-cylinder engine and a transmission and is suspended by the main frame 21 in a state where the engine 3 is transversely disposed.

Into the engine 3, air is taken via an intake pipe, not shown, and is then mixed with fuel by a fuel injection device. The air-fuel mixture is then supplied to a combustion chamber. An exhaust gas after combustion in the combustion chamber is discharged from a muffler 12 via an exhaust pipe 11 extending downward from the engine 3. Although not described in detail, the vehicle body frame 2 and the like are provided with a streamlined cowling 13 as an exterior of the vehicle body.

The engine 3 is provided with a lubrication structure for supplying oil to many internal components or parts. The oil supplied to the respective components forms oil films on the surfaces of the components, the thus formed oil films reducing friction resistance and wear of the components. The oil films formed on the component surfaces further attain various functions such as a cleaning operation of cleaning metal powder, a hermetical operation of hermetically sealing combustion gas, a cooling operation of cooling the components, a shock-absorbing operation of absorbing shock between the constructional components or parts, and a rust preventing operation of preventing rust from being caused by oxygen and moisture.

Furthermore, when the temperature becomes low, the viscosity of the oil is increased and hence it is hard to supply the oil to the components in the engine 3.

Taking the above phenomenon into consideration, the oil passage structure according to the present embodiment enables to steadily supply the oil to a crankshaft having a particularly large amount of rotation in the engine 3 regardless of the viscosity of the oil.

Figure 2:
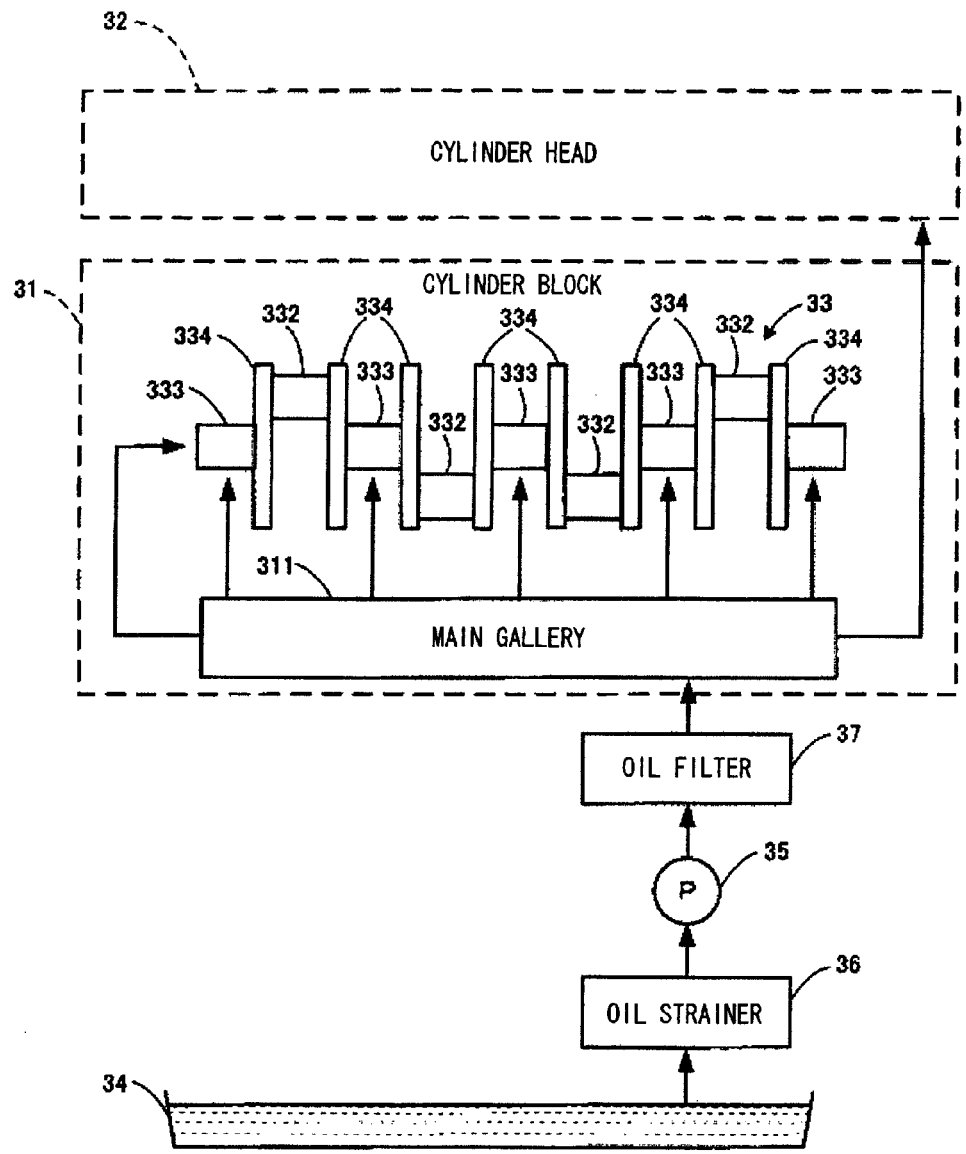
FIG. 2 is a block diagram to show an oil circulation of an engine having the oil passage structure according to the present embodiment.
Figure 3:
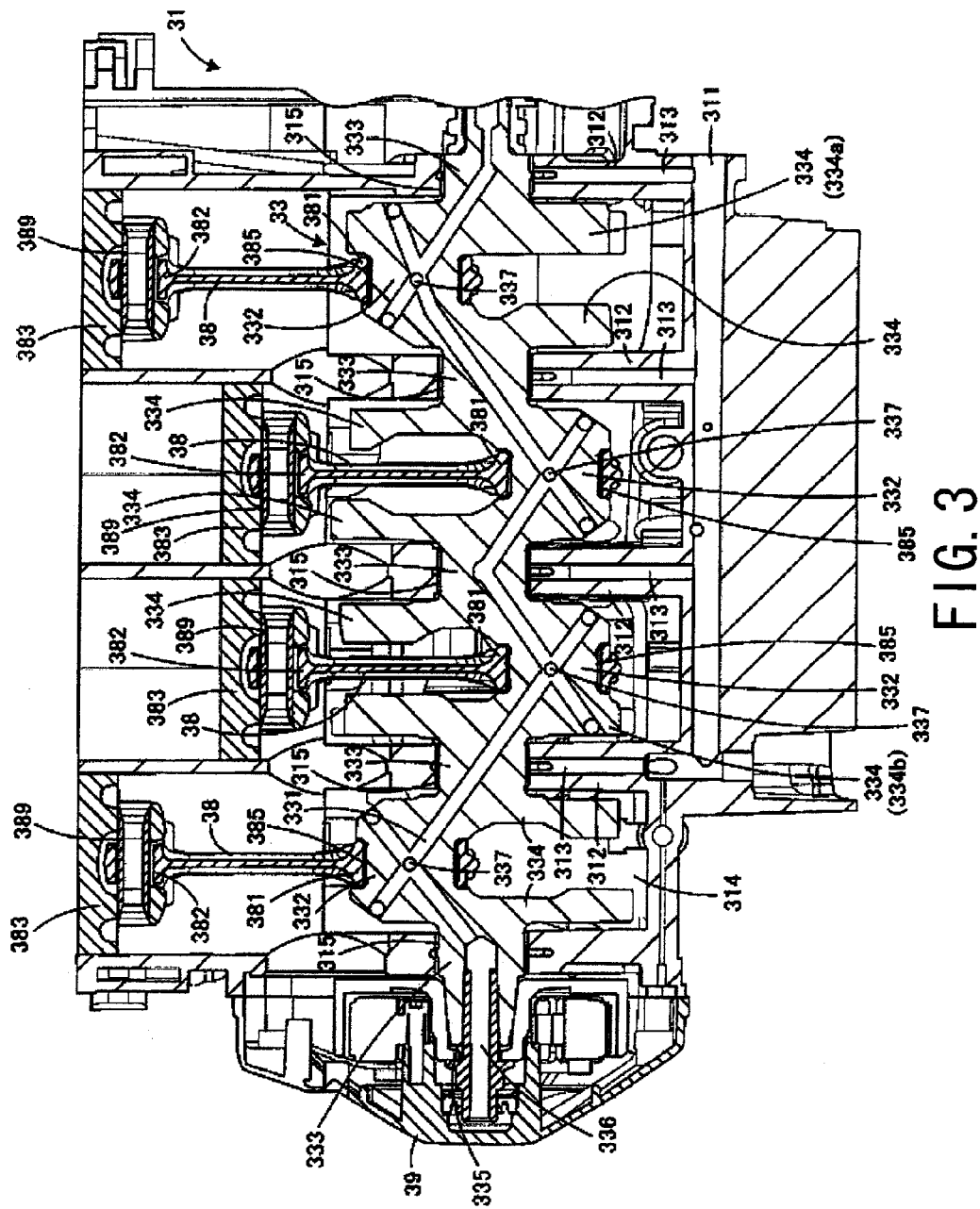
FIG. 3 is a section view around a crankshaft of the engine.
Figure 4:
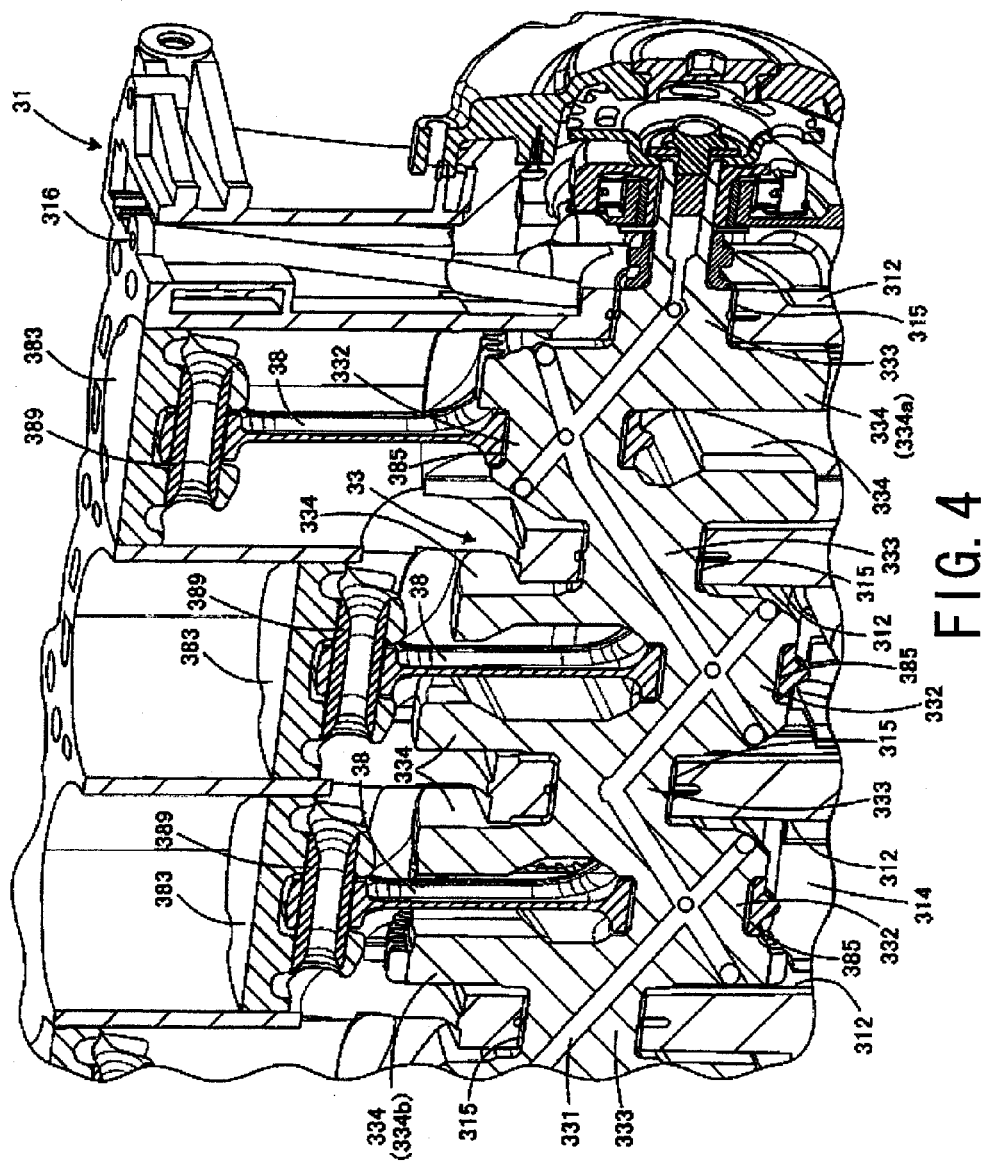
FIG. 4 is a partially enlarged perspective view of the engine of FIG. 3.

Then, hereinafter, the oil passage structure of an engine according to the present embodiment will be described in detail with reference to FIG. 2 to FIG. 5, in which FIG. 2 is a block diagram to show an oil circulation of the engine, FIG. 3 is a sectional view around a crankshaft of the engine, FIG. 4 is a perspective view of FIG. 3, and FIGS. 5A to 5C are illustrations of an oil clearance of a crankpin and an oil clearance of a crank journal. Further, the block diagram in FIG. 2 mainly illustrates a supply passage for the crankshaft and omits other supply passages.

As shown in FIG. 2, the oil is stored in an oil pan 34 disposed in a lower portion of the engine 3 to be fed under pressure to the various components or parts of the engine 3. The oil in the oil pan 34 is sucked from a strainer 36 by an oil pump 35 that is driven by a crankshaft 33. At this time, large foreign matters are removed from the oil by a metal mesh or the like disposed in the strainer 36. The oil sucked from the strainer 36 is pressure-fed by the oil pump 35 to a main gallery 311 formed in a cylinder block 31 via an oil filter 37. At this time, soil and small foreign particles in the oil are removed by a filter paper or the like of the oil filter 37.

The oil fed under pressure to the main gallery 311 is then supplied to the crankshaft 33 supported by journal walls (support portions, see FIG. 3) 312 of the cylinder block 31. Into the crankshaft 33, the oil is supplied to crankpins 332 via a first oil passage 331, which will be described later, and the oil is also supplied to a crank journal 333 via a second oil passage 313, which will be also described later, formed in a journal wall 312. Further, a portion of the oil pressure-fed to the main gallery 311 is supplied to a camshaft and others disposed in a cylinder head 32. The oil lubricating the components or parts of the engine 3 then flows down by own weight and is returned to the oil pan 34.

As shown in FIG. 3, the cylinder block 31 has a plurality of journal walls 312 formed therein so as to partition a crank chamber 314 for receiving the crankshaft 33. The crankshaft 33 is rotatably supported by a plurality of journal walls 312 in a plurality of crank journals 333.

The crankpin 332 is disposed at a position eccentric with respect to the crank journal 333 positioned on a rotating axis between the respective crank journals 333. The respective crank journals 333 are integrated with the respective crankpins 332 via respective crank arms 334. In this regard, some of the crank arms 334 are provided with a primary drive gear 334a and a balancer drive gear 334b formed thereon, the primary drive gear 334a transmitting power to a transmission, and the balancer drive gear 334b transmitting power to a balance shaft.

The crank journal 333 is rotatably supported by the journal wall 312 via a sliding bearing 315. The crankpin 332 is swingably coupled to a big end 381 (one end having a large diameter in comparison with the other end) of a connecting rod 38 via a sliding bearing 385. A piston 383 is coupled to a small end 382 (the other end having a diameter smaller than the one end 381) of the connecting rod 38 via a piston pin 389. A reciprocating motion of the piston 383 in the cylinder is transmitted to the crankpin 332 via the connecting rod 38, and the crankshaft 33 is rotated by a revolving movement around the crank journal 333 of the crankpin 332.

A first oil passage 331 connecting with the main gallery 311 via a flow channel, not shown, of a generator cover 39 is formed in the crankshaft 33.

An opening 336 as an inlet of the first oil passage 331 is formed in one end face 335 of the crankshaft 33, and on the other hand, an opening 337 as an outlet of the first oil passage 331 is formed in each of the crankpins 332.

Further, the first oil passage 331 has a plurality of flow channels obliquely connecting between the openings 337 of the crankpins 332 next to each other. The oil coming into the crankshaft 33 from the one end face 335 of the crankshaft 33 is supplied to the respective crankpins 332 in order from the top (front) crankpin 332 (shown on the left side in the drawing) through the first oil passage 331. The oil is then supplied between the crankpin 332 and the sliding bearing 385 disposed on the connecting rod 38 via the opening 337.

A second oil passage 313 connecting with the main gallery 311 is formed in the journal wall 312 of the cylinder block 31. The second oil passage 313 extends in a vertical direction in the journal wall 312 and communicates with an oil groove partially opened in the sliding bearing 315. The oil fed into the oil groove from the second oil passage 313 is supplied between the sliding bearing 315 disposed on the journal wall 312 and the crank journal 333.

Further, the first and second oil passages 331, 313 communicate with each other in the crank journal 333 and the journal wall 312, which are apart farthest from the one end face 335 of the crankshaft 33 (see FIG. 6).

In this arrangement, the first oil passage 331 is communicated with the second oil passage 313 via a communication passage 338 passing through the crank journal 333, which is apart farthest from the one end face 335 of the crankshaft 33, in a radial direction. In this way, the oil is supplied into the first oil passage 331 also from the second oil passage 313, thereby compensating for an oil shortage in the first oil passage 331 in the case of the low temperature and high viscosity of the oil.

Accordingly, as mentioned above, the crankpin 332, which is apart farthest from the one end side of the crankshaft 33, is subjected to the oil supply not only from the one end side of the crankshaft 33 but also from the other end side, whereby the crankpin 332 can be stably supplied with the oil even when the temperature is low and hence the viscosity of the oil is high. Furthermore, a discharge capacity of the oil pump 35 can be decreased and a mechanical loss can be hence reduced.

Further, an inside diameter of the first oil passage 331 is formed in a size slightly larger than an inside diameter of the first oil passage 313. For this reason, in the ordinary operation, an oil supply to the crankpin 332 from the first oil passage 331 is prior to an oil supply to the crankpin 332 from the second oil passage 313. Furthermore, a third oil passage 316 for feeding the oil into the cylinder head 32 is formed in the cylinder block 31 (see FIG. 4). The third oil passage 316 extends in the vertical direction above the crankshaft 33 and is communicated with the second oil passage 313 under the crankshaft 33.

When the engine 3 is stopped in operation, the oil supplied to the cylinder head 32 falls down under own weight thereof to the cylinder block 31 side via the third oil passage 316. The oil falling down from the cylinder head 32 flows into the second oil passage 313 and is then supplied to a portion between the crank journal 333 and the sliding bearing 315. In this way, when the engine 3 is again started, the oil shortage problem can be solved, and hence, the crankshaft 33 can be prevented from being seizure.

Figure 5A:
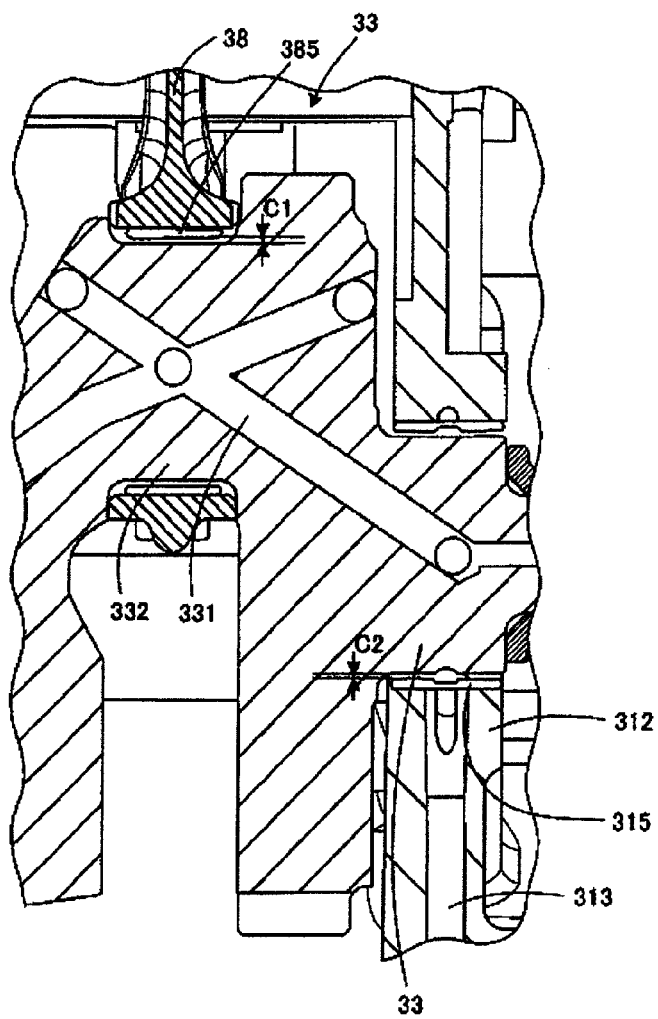
FIGS. 5A to 5C illustrates an oil clearance of a crankpin and an oil clearance of a crank journal of the engine according to the present embodiment.
Figure 5B:
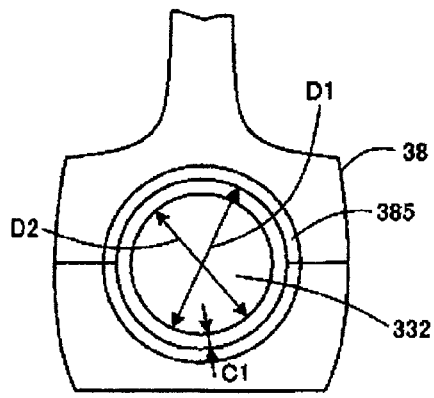
Figure 5C:
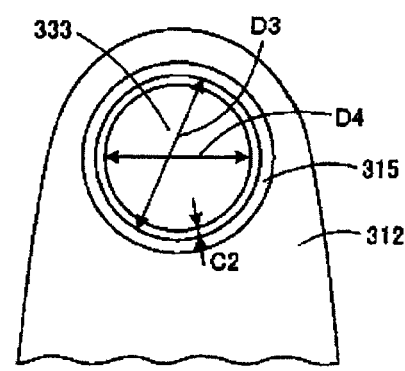

Furthermore, as shown in FIGS. 5A to 5C, the crankshaft 33 is coupled to the connecting rod 38 with an oil clearance C1 formed between a sliding surface of the crankpin 332 and a sliding surface of the sliding bearing 385 of the connecting rod 38. The oil clearance C1 in the crankpin 332 is calculated by the following formula (1)

$$C1=(D1-D2)/2 \qquad (1)$$

where an inside diameter of the sliding bearing 385 is D1 and an outside diameter of the crankpin 332 is D2.

The oil is supplied to the oil clearance C1 via the first oil passage 331 to thereby form an oil film for smoothly swinging the connecting rod 38 with respect to the crankpin 332.

Still furthermore, the crankshaft 33 is supported by the crank journal wall 312 with an oil clearance C2 formed between a sliding surface of the crank journal 333 and a sliding surface of the sliding bearing 315 of the journal wall 312. The oil clearance C2 in the crank journal 333 is calculated by the following formula (2)

$$C2=(D3-D4)/2 \qquad (2)$$

where an inside diameter of the sliding bearing 315 is D3 and an outside diameter of the crank journal 333 is D4.

The oil is supplied to the oil clearance C2 via the second oil passage 313 to thereby form an oil film for smoothly rotating the crank journal 333 with respect to the journal wall 312.

In this case, since the oil clearance C1 in the crankpin 332 is formed in a size slightly larger than the oil clearance C2 in the crank journal 333, an oil leak is reduced in a communication portion of the first and second oil passages 331, 313 in the crank journal 333 which is apart farthest from the one end face 335 of the crankshaft 33. Thus, the oil easily flows from the second oil passage 313 to the first oil passage 331, and hence, an amount of oil to be supplied to the crankpin 332, which is apart farthest from the one end side of the crankshaft 33, can be ensured.

According to the construction described above, a sufficient amount of oil can be supplied to the sliding surfaces of the crankpins in a range in which an engine rotation speed changes from a low rotation speed to a high rotation speed and in a range in which an oil temperature changes from a low temperature to a high temperature.

Figure 6A:
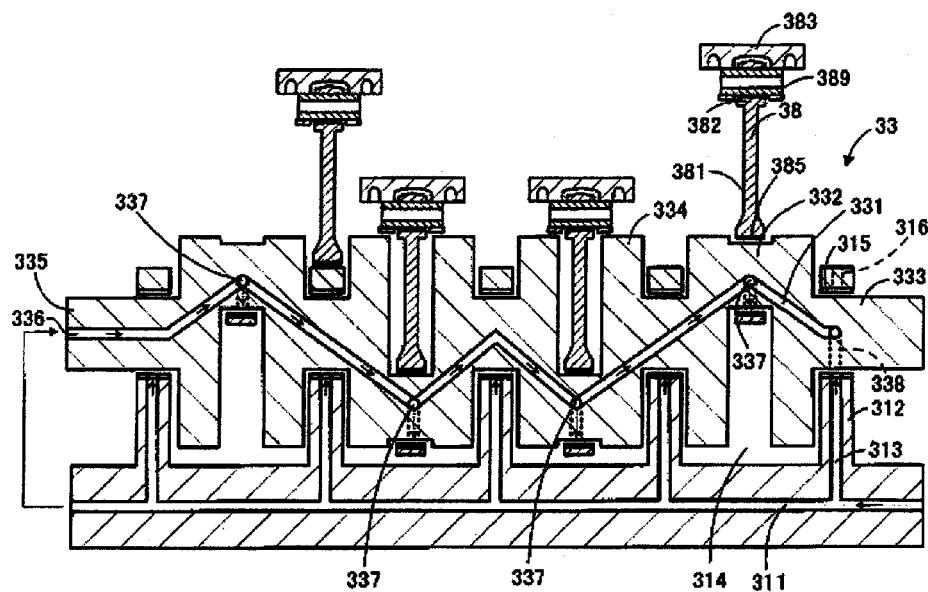
FIG. 6 includes FIGS. 6A and 6B, which are schematic views to show an example of an oil supply to the crankpin of the engine.
Figure 6B:
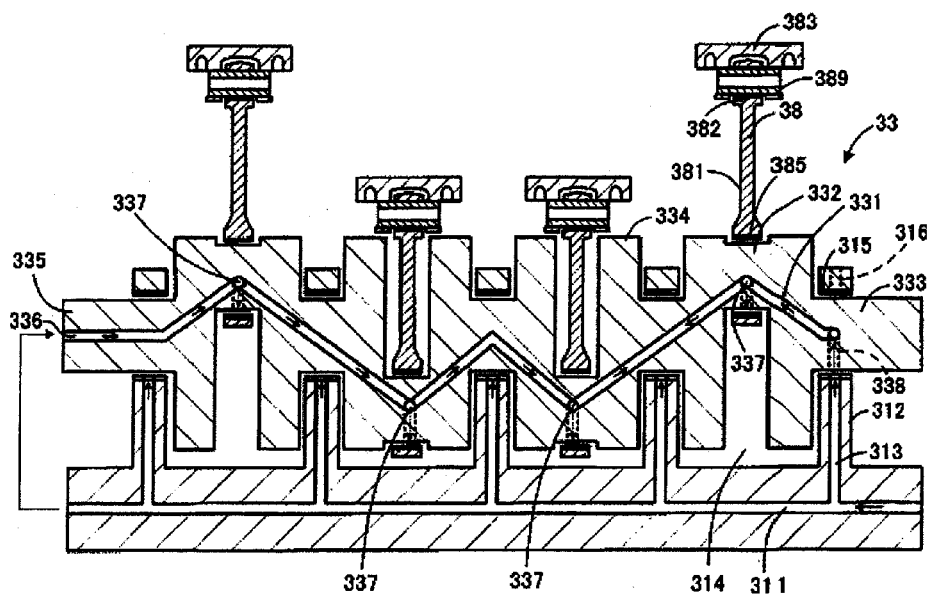
Figure 7:
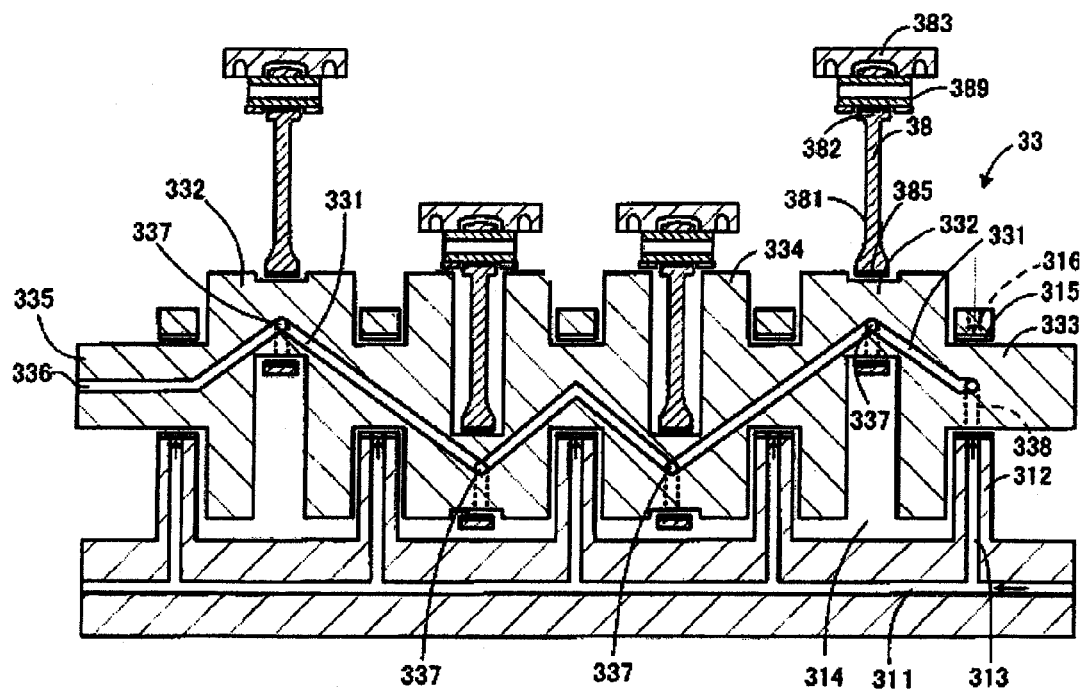
FIG. 7 is a schematic sectional view to show an example of the oil supply, when the engine is stopped, to the crank journal for explaining an oil supply operation according to the present embodiment.

Herein, an example of an oil supply to the crankpin will be described with reference to FIG. 6 and FIG. 7, in which FIGS. 6A and 6B are schematic views to show an example of the oil supply to the crankpin according to the present embodiment, and FIG. 7 is a schematic view to show an example of the oil supply, when the engine is stopped, to the crank journal.

That is, FIG. 6A shows the oil supply to the crankpin when the engine is rotated at a high speed and FIG. 6B shows the oil supply to the crankpin when the engine is rotated at a low speed immediately after the engine is started.

More specifically, as shown in FIG. 6A, when the engine 3 is rotated at the high speed, the oil is pressure-fed to the one end side of the crankshaft 33 from the main gallery 311 by the operation of the oil pump 35. The oil entering into the crankshaft 33 from the one end side of the crankshaft 33 is then fed toward the other end side of the crankshaft 33 through the first oil passage 331.

In the manner mentioned above, the oil is supplied to the respective crankpins 332 in order from the crankpin 332 positioned on the one end side of the crankpin 332 to the crankpin 332 positioned on the deep end side of the crankpin 332. The oil supplied to the respective crankpins 332 is fed out to the outside from the openings 337 of the respective crankpins 332 to form oil films on the sliding surfaces of the respective crankpins 332. Thus, the large ends 381 of the connecting rod 38 can be smoothly swung with respect to the crankpins 332.

Further, at a time when the engine 3 is rotated at the high speed, the oil is pressure-fed to the second oil passage 313 in the journal wall 312 by the oil pump 35. The oil in the second oil passage 313 is supplied to the crank journal 333 via the oil groove opened in the sliding bearing 315 to form the oil film on the sliding surface of the crank journal 333. In this way, the crank journal 333 can be smoothly rotated with respect to the journal wall 312.

At this time, the first and second oil passages 331, 313 communicate with each other on the other end side of the crankshaft 33. However, when the crankshaft 33 (crank journal 333) is rotated at the high speed, a strong centrifugal force is applied to the oil, and accordingly, the oil is hard to flow into the first oil passage 331 from the second oil passage 313. In addition, since the inside diameter of the second oil passage 313 is formed in a size smaller than the inside diameter of the first oil passage 331, when the crankshaft 33 is rotated at the high speed, the oil supply to the crankpin 332, which is positioned on the other end side (deepest side) of the crankshaft 33, by the first oil passage 331 is prior to the oil supply to the crankpin 332 by the second oil passage 313.

As shown in FIG. 6B, at a time when the engine 3 is rotated at the low speed immediately after the engine 3 is started, the oil is pressure-fed to the one end side of the crankshaft 33 from the main gallery 311 by the oil pump 35. The oil entering into the crankshaft 33 from the one end of the crankshaft 33 is fed toward the other end of the crankshaft 33 through the first oil passage 331. At this time, if the oil has high viscosity, since the first oil passage 331 is formed in a large length, it takes a long time for the oil to flow from the crankpin 332 positioned on the one end side to the crankpin 332 positioned on the deepest side. Hence, immediately after the engine 3 is started, it is likely that the oil supplied from the one end side of the crankshaft 33 is not yet fed to the crankpin 332 on the other end side of the crankshaft 33.

Furthermore, at a time when the engine 3 is rotated at the low speed immediately after the engine 3 is started, the oil is pressure-fed to the second oil passage 313 in the journal wall 312 by the oil pump 35. The oil in the second oil passage 313 is supplied to the crank journal 333 via the oil groove opened in the sliding bearing 315 to form the oil film on the siding surface of the crank journal 333. At this time, the oil flows into the first oil passage 331 from the second oil passage 313 via the communication passage 338 on the other end side of the crankshaft 33.

The oil from the second oil passage 313 flows through the first oil passage 331 and is supplied to the crankpin 332 located on the other end side of the crankshaft 33.

In the manner mentioned above, immediately after the engine 3 is started, the oil from the other end side of the crankshaft 33 is supplied to the crankpin 332, which is positioned on the other end side and to which the oil supplied from the one end side of the crankshaft 33 is not yet fed. In such occasion, when the crankshaft 33 (crank journal 333) is rotated at the low speed, since the centrifugal force applied to the oil is weak the oil can easily flow into the first oil passage 331 from the second oil passage 313.

Further, as described above, the oil clearance C1 in the crankpin 332 is larger than the oil clearance C2 in the crank journal 333, so that an oil leak in the communication portion of the first and second oil passages 331 and 313 is reduced. Thus, the oil can easily flow from the second oil passage 313 to the first oil passage 331.

In the present embodiment, the first oil passage 331 is communicated with the, second oil passage 313 on the upstream side of the main gallery 311. Accordingly, at a time when the engine 3 is started, the oil can be quickly supplied to the first oil passage 331 from the second oil passage 313, thus preventing the oil supply from delaying in following a startup of the engine. In this way, even immediately after the engine 3 is started, the oil can be steadily supplied to the crankshaft 33.

As shown in FIG. 7, at a time when the engine 3 is stopped, the oil supplied to the respective components or parts of the crankshaft 33 is returned to the oil pan 34 through the respective components or parts of the engine 3. At this time, the oil supplied to the cylinder head 32 flows down to the cylinder block 31 side via the third oil passage 316 under the own weight. Further, since the third oil passage 316 communicates with the second oil passage 313, the oil from the cylinder head 32 is supplied to the crank journal 333 via the second oil passage 313. Therefore, the crankshaft 33 in the time of re-starting the engine 3 can be prevented from seizing.

As described above, according to the oil passage structure of the present embodiment, when the crankshaft 33 is rotated at the high speed, the oil is supplied to the sliding surfaces of the respective crankpins 332 through the first oil passage 331. Furthermore, at a time when the temperature is low and the viscosity of the oil is high, although the oil is hard to flow in the first oil passage 331, an oil shortage in the first oil passage 331 can be compensated for by the oil supplied from the second oil passage 313 via the communication portion, thereby inhibiting the oil supply from delaying in following a startup of the engine and adequately supplying the oil to the sliding surfaces of all crankpins 332.

Furthermore, according to the present embodiment, since a steady oil supply to the crankshaft 33 can be ensured, an excess discharge capacity of the oil pump 35 can be suppressed and a mechanical loss can be reduced. Still furthermore, the communication passage of the first and second oil passages 331, 313 in some crank journal and journal wall can be made or eliminated by changing the crankshaft. For example, in the case of an engine for a cold area, immediately after the engine is started, the viscosity of the oil becomes high, and hence, a crankshaft having an opening formed in a portion of a crank journal is used. On the other hand, in the case of an engine for a tropical area, immediately after the engine is started, the viscosity of the oil becomes low, and hence, a crankshaft not having an opening formed in the crank journal is used.

It is further to be noted that the present invention is not limited to the embodiment described above, and many other changes and modifications may be made without departing from the objects of the present invention and the scopes of the appended claims, and for example, the sizes and shapes shown in the accompanying drawings are not limited to illustrated ones, and can be changed as required.

For example, the oil passage structure according to the present embodiment has been described with reference to the four-cylinder engine as the example, but is not limited to this structure, and it is essential only that the first and second oil passages communicate with each other in some of the crank journals and some of the journal walls. That is, for example, the oil passage structure can be applied also to a six-cylinder engine. In the six-cylinder engine, even if the oil is supplied from both end portions of the crankshaft, when the temperature is low, a shortage of oil supply is easily caused in the central portion of the crankshaft. In such case, according to the present embodiment, the shortage of oil supply at the time of low temperature can be prevented by making the first and second oil passages communicate with each other in the central portion.

Furthermore, in the oil passage structure according to the present embodiment, the first and second oil passages communicate with each other in the crank journal and the journal wall, which are apart farthest from the one end face of the crankshaft. However, the oil passage structure is not limited to this structure, and the first and second oil passages may be made to communicate with each other in the crank journal and the journal wall which are disposed on the one end face side of the crankshaft. Further, it may be possible to communicate the first and second oil passages with each other in a plurality of crank journals and journal walls.

Still furthermore, in the oil passage structure according to the present embodiment, although the inside diameter of the first oil passage is formed in the size larger than the inside diameter of the second oil passage, the oil passage structure is not limited to this structure, and for example, if an oil supply from the first oil passage is prior at a time except for the low temperature in which the viscosity of the oil is high, the inside diameter of the first oil passage may be equal to the inside diameter of the second oil passage or may be smaller than the inside diameter of the second oil passage.

What is claimed is:
1. An oil passage structure of an engine comprising:
a connecting rod swingably coupled to a crankshaft by a plurality of crankpins, the plurality of crankpins being disposed between a plurality of crank journals; and
a plurality of support portions rotatably supporting the crankshaft by the plurality of crank journals in a cylinder block, wherein the crankshaft has a first oil passage formed therein, the plurality of support portions have a second oil passage formed therein, the second oil passage supplying the oil to a sliding surface of each of the plurality of crank journals, and the first oil passage and the second oil passage communicate with each other in the support portion and the crank journal which are disposed at a position apart farthest from the one end face of the crankshaft, wherein the first oil passage supplies oil from an opening formed in one end face of the crankshaft to sliding surfaces of the plurality of crankpins, and also communicates with a main gallery in the crankshaft, the crankpins each being formed with an opening as an outlet to the first oil passage such that the oil entering from the one end face of the crankshaft is sequentially supplied from a most front side crankpin through the first oil passage and the oil is supplied to a portion between the crankpins and a sliding bearing mounted to the connecting rod through the opening as outlet, wherein the oil is pressure-fed to the one end side of the crankshaft from the main gallery by operation of an oil pump, and the oil entering into the crankshaft from the one end side of the crankshaft is then fed toward the other end side of the crankshaft through the first oil passage so that the oil is supplied to the respective crankpins from the crankpin positioned on the one end side of the crankpin to the crankpin positioned on another end side thereof and the oil is then fed out to outside from the openings of the respective crankpins to form oil films on the sliding surfaces of the respective the crank journal through the oil groove opened in the sliding bearing crankpins, wherein the oil pressure-fed to the second oil passage is supplied to form the oil film on the sliding surface of the crank journal, and on another end side of the crankshaft, the oil flows from the second oil passage to the first oil passage, and the oil is then supplied to the crankpin disposed on the position on the other end side of the crankshaft, and wherein the first oil passage penetrates all the crankshafts and the crankpins so as to communicate with all the openings of the crankpins and extends from the crankpin most apart from the one end face of the crankshaft to the support most apart from the one end of the crankshaft.

2. The oil passage structure according to claim 1, wherein an inside diameter of the first oil passage is larger than an inside diameter of the second oil passage.

3. The oil passage structure according to claim 1, wherein the cylinder block has a third oil passage formed therein so as to supply the oil to a cylinder head and communicate with the second oil passage.

4. The oil passage structure according to claim 1, wherein an oil clearance formed between a sliding surface of the connecting rod and the sliding surface of the crankpin is larger than an oil clearance formed between a sliding surface of the support portion and a sliding surface of the crank journal, with which the first oil passage and the second oil passage communicated.

* * * * *